United States Patent [19]

Dupen

[11] 3,959,072
[45] May 25, 1976

[54] COMPACTABLE CONTROL ELEMENT ASSEMBLY FOR A NUCLEAR REACTOR

[75] Inventor: Clive Frederick George Dupen, San Diego, Calif.

[73] Assignee: Combustion Engineering, Inc., Windsor, Conn.

[22] Filed: Sept. 27, 1973

[21] Appl. No.: 401,483

[52] U.S. Cl. ............................................. 176/36 R
[51] Int. Cl.² ......................................... G21C 7/08
[58] Field of Search ............ 176/34, 35, 36 R, 36 C, 176/33, 86

[56] References Cited
UNITED STATES PATENTS

| | | | |
|---|---|---|---|
| 2,898,281 | 8/1959 | Untermyer et al. | 176/34 |
| 2,935,456 | 5/1960 | Huston | 176/34 |
| 3,595,748 | 1/1968 | Risch et al. | 176/36 R |

*Primary Examiner*—Samuel Feinberg
*Attorney, Agent, or Firm*—Stephen L. Borst

[57] ABSTRACT

A compactable control element assembly for a nuclear reactor in which the absorber pins of the assembly are compacted during downward movement of the pin and are returned to their uncompacted state when downward movement is stopped. The control element assembly comprises a support member longitudinally movable within a control assembly duct and a plurality of absorber pins supported laterally outward of the support member and within the duct by pairs of support arms. The absorber pins are pivotably mounted to the support arms and the support arms in turn are supported from the support member for upward pivotable movement in a longitudinal plane. As the support member is moved downward, the support arms pivot upwardly and the absorber pins move upwardly and inwardly towards the support member. When the support member is stopped the absorber pins return to their uncompacted position.

19 Claims, 5 Drawing Figures

COMPACTABLE CONTROL ELEMENT ASSEMBLY FOR A NUCLEAR REACTOR

BACKGROUND OF THE INVENTION

Power generation in a nuclear reactor is accomplished by initiating a self-sustaining chain reaction. The amount of fissionable fuel used in the chain reaction is such that the multiplication factor (ratio of neutrons produced by fission in each generation to the number of neutrons in the preceding generation) can be made more than unity. To control this multiplication factor and accordingly the power output of the reactor, control or absorber elements are used to absorb neutrons within the reactor.

In the fast spectrum reactor context in which fast neutrons, as opposed to thermal neutrons, are used to sustain the chain reaction, the control assemblies are interspersed within a closely packed array of fuel assemblies. Both the fuel assemblies and the control assemblies are generally of a closed housing type in which the housings surrounding the fuel or control elements are provided with flow openings to permit coolant to flow therethrough. The coolant, which may be a liquid metal such as sodium, removes the thermal energy produced by the nuclear fissioning of the fuel.

The placement of the control assemblies within the array of fuel assemblies is such as to provide the most effective and efficient control of the reactor. Generally, this aided by providing three types of control assemblies. One type provides a general reactivity level control to regulate power output of the reactor. A second type provides fine control of reactivity within very small increments to compensate for drifts in reactor operating conditions. The third type of control elements rapidly reduce the reactivity level within the reactor to below the critical self-sustaining level in the event of certain particular malfunctions. These latter control assemblies are known as safety control assemblies since they act to rapidly shutdown the reactor. Also, the control elements of the other assemblies may generally be fully inserted simultaneously with the safety control elements if the reactor is scrammed.

Ordinarily the safety control element assemblies are comprised of a plurality of longitudinally extending parallel absorber elements adapted for longitudinal movement within the housing or duct. During normal reactor operation the elements of a safety control assembly are suspended as a unit inside the duct but above the fissile fuel zone. When the reactor is tripped or scrammed the safety elements are released by a latch at their upper end and are driven downward under the action of gravity. In some instances, a spring may be included to insure release from the latch and to initially accelerate the elements downwardly. When the latch releases, the safety element insertion is entirely controlled by conditions inside the duct, e.g., spring force, fluid drag, element weight, buoyancy and sliding friction. Accordingly, if severe duct distortions occur, the safety elements may become jammed in the duct and therefore not inserted.

Control assembly duct distortion can occur as a result of a variety of phenomena. Some distortion is inherent during reactor operation and generally may be predicted. Examples of such predictable duct distortion include bowing of the duct as a result of a temperature differential across the duct, nonsymmetrical neutron induced swelling and distortion of the duct material and differences in creep under stress. Since such distortions are predictable, the control assembly can be designed to accommodate this. This is what has been done in the past. However, duct distortion can also occur as a result of unforeseen and unpredictable phenomena, such as "denting" of the duct during fuel handling, adjacent fuel assembly failure, and failure of the radial core restraints which normally clamp the fuel and control assemblies together. As can be appreciated, in these instances it is still desirable, if not more desirable, to prevent the control or absorber elements from becoming jammed in the duct.

Prior art methods of accommodating possible unpredictable distortion have included providing more clearance between the absorber elements and the interior wall of the duct and/or placing a sleeve around the elements within the duct. However these method are not fully satisfactory since they result in an uneven distribution of the coolant around the element and reduction in neutron absorbing characteristics.

SUMMARY OF THE INVENTION

Accordingly, the present invention overcomes the above discussed and other disadvantages of the prior art by providing a control assembly in which the absorber elements are moved in response to longitudinal movement in one direction to increase the minimum lateral clearance between the absorber elements and the interior wall of the duct. When the longitudinal movement of the elements is stopped, the elements are returned to their initial lateral spacing.

More specifically, the absorber elements are compacted as they are inserted into the core and then returned to their uncompacted state or position when the movement is stopped.

Stated more narrowly, the control element assembly comprises a support member and a plurality of absorber pins supported laterally outward of the support member by pairs of support arms. The absorber pins are pivotably mounted on the support arms and the arms are supported from the support member for pivotable movement in a longitudinal plane. As the support member is moved downward, the support arms are pivoted and the absorber pins are moved upwardly and inwardly towards the support member thereby compacting the absorber pins to permit free descent of the assembly despite distortion of the duct.

In this way the control assembly is inherently able to accommodate unpredictable or unforeseen duct distortions and accordingly reduce the probability of the absorber elements becoming jammed in the duct without relying upon means external to the assembly.

DESCRIPTION OF THE PREFERRED EMBODIMENT

Figure 1:
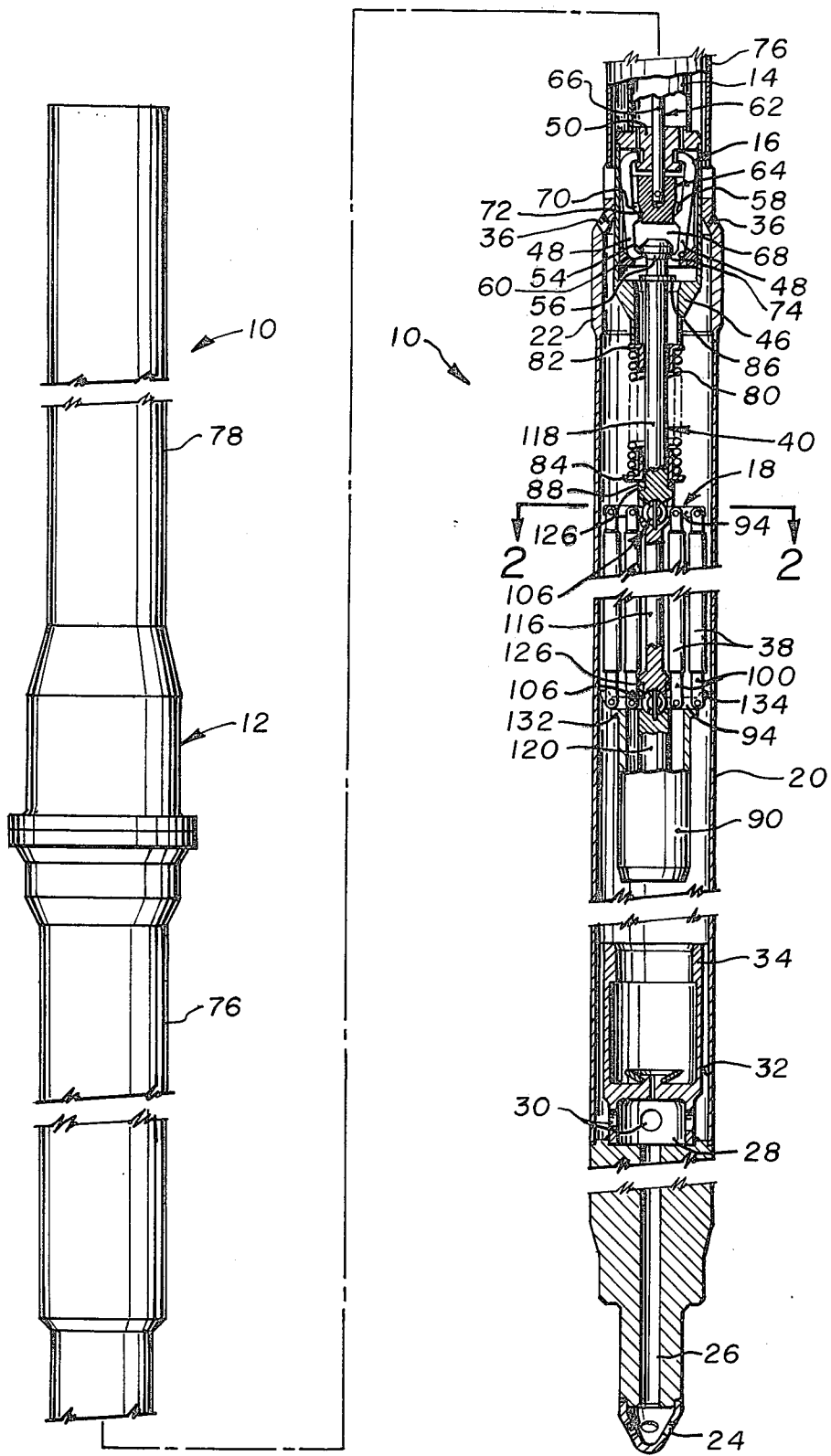
FIG. 1 is a side elevation of a control element assembly of the present invention.

Referring now to the drawings, FIG. 1 shows a control element assembly 10 for placement within the core of a nuclear reactor and more particularly the core of a fast spectrum reactor wherein fast neutrons are used to sustain the nuclear fission chain reaction. The control element assembly 10 is generally comprised of a drive mechanism 12, a drive extension 14, a latch mechanism 16, an absorber assembly 18 and a control element assembly duct or housing 20.

The control element duct 20 is hexagonal in cross section (see FIG. 2) and is positionable within an array of hexagonally shaped fuel assemblies (not shown) which form the core of the fast spectrum reactor. The upper end of the duct 20 is aligned by means of a spacer pad 22 integrally formed on the outer surface of the duct 20 which engages similar pads on adjacent fuel assemblies. Clamps (not shown) may be provided around the periphery of the core which act on these spacer pads to restrain the fuel and control assemblies against lateral movement within the core. The lower end plug of the duct 20 is aligned in an appropriate opening in a core support plate (not shown).

Coolant flow for cooling the absorber assembly 18 is admitted into the interior of the duct 20 through coolant inlet openings 24 in the lower end plug of the duct 20. This coolant passes upwards through a central bore 26 to a distribution chamber 28 and then flows out through openings 30 to the annulus 32 defined between the interior wall of the duct 20 and a dashpot 34. The coolant continues to flow upward, over and around the absorber assembly 18 and exits from the duct 20 through outlet openings 36 above the spacer pads 22.

The absorber assembly 18 which is longitudinally movable within the duct 20, comprises a plurality of longitudinally extending, parallel absorber elements or pins 38 supported from a central support member 40 in a manner described hereinbelow. The absorber pins 38 are generally comprised of a neutron absorbing material 42, such as boron carbide or tantalum, which is contained within a cladding 44. The absorber pins 38 act to control the reactivity of a core by absorbing neutrons depending on the relative position of the absorber assembly 18 with respect to the fuel in the core. To adjust this longitudinal position of the absorber pins 38, the absorber assemblies 18 are coupled to the drive extension 14 which in turn is connected to the drive mechanism 12. For safety control element assemblies, the absorber assemblies 18 are normally held above the fissile fuel region and are only inserted into the core when it is desirable to rapidly shut down the reactor.

When the absorber assembly 18 is coupled to the drive extension 14, the upper end of the central support member 40 extends into and through the lower collar 46 on the drive extension 14 and is held thereinplace by a latch mechanism 16. The latch mechanism 16 is of the releasable gripper type and comprises a set of gripper jaws 48 (two shown) which are mounted in recesses of a gripper jaw holding section 50 integrally formed with the drive extension 14 above the lower collar 46. The mounting is accomplished such that the jaws 48 are capable of radially pivotable movement. Each of the gripper jaws 48 has a gripping surface 54 which selectively serves to grip the head portion 56 at the upper end of the central support member 40 of the absorber assembly 18. Each of the jaws 48 additionally has an unlatching cam face 58 and a latching cam face 60 which interact with a gripper release mechanism 62 to position the jaws 48 for selective gripping or release of the central support member 40. The gripper release mechanism 62 has a gripper jaw actuator 64 at its lower end connected to an upwardly extending shaft 66. The actuator 64 has a hollow portion 68 into which the central support shaft 40 extends. The actuator 64 has openings 70 (two shown) which extend through the main body thereof and through which the gripper jaws 48 extend into the hollow portion 68. The openings 70 have an unlatching cam surface 72 formed therein, while the lower portion of the actuator 64 has a latching cam surface 74 formed integral therewith.

The latching and unlatching of the latching mechanism 16 is accomplished by relative vertical movement of the gripper actuator shaft 66. Upward movement of the shaft 66 relative to the drive extension 14 causes the latching cam surfaces 74 of a gripper jaw actuator 64 to engage the cam faces 60 of the gripper jaw 48 to move the jaws 48 radially inwardly to grip the head 56 of the central support shaft 40. Downward relative movement of the shaft 66 causes the unlatching cam surfaces 72 of the actuator 64 to engage the unlatching cam faces 58 of the jaws 48 to move the grippers 48 radially outward so as to release their grip on the head 56 of the central support shaft 40 to cause a positive disengagement thereof. Relative vertical movement of the shaft 66 can be accomplished in any of a variety of well known ways such as mechanically or fluidly.

The drive extension 14 extends upwardly through the guide tube 76 which overlies the control element assembly duct 20, and which is supported by the reactor vessel head. At its upper end, the drive extension 14 is operatively connected to the drive mechanism 12 such as by a ball nut and screw coupling. The drive mechanism 12, which is housed within a casing 78, is mounted to the top of the guide tube 76 and drives the drive extension 14 vertically upwards and downwards to permit coupling with the absorber assembly 18 and to adjust the longitudinal position of the absorber assembly 18 within the reactor core.

It should be noted that the particular drive mechanism 12, drive extension 14 and latching mechanism 16 shown and described herein is similar to that shown in U.S. Pat. No. 3,733,251 entitled CONTROL ROD RELEASE MECHANISM. It is not intended that the present invention be limited to use with this particular arrangement since the invention is also equally applicable with use of any of a variety of other well known arrangements.

Also, as shown by way of example in U.S. Pat. No. 3,733,251 and not intended to be limiting on the present invention, the absorber assembly 18 is provided with a scram assist spring 80 and a dashpot 34. The scram assist spring 80 is mounted between two flanged sleeves 82, 84, slidably positioned on the central support shaft 40 adjacent to its upper end. Normally the two sleeves 82, 84 are seated and retained against upper and lower shoulders 86, 88 formed integrally along the length of the central support shaft. However, when the absorber assembly 18 is latched to the drive extension 14, the lower collar 46 of the drive extension 14 engages the upper sleeve 82 to compress the spring 80. Then, when the latch 16 is released, the absorber assembly 18 will be accelerated downward by the scram assist spring 80 and be free to fall under the influence of gravity. The downward movement of the absorber assembly 18 is dampened and eventually stopped by the piston or plunger 90 attached to the lower end of the central support shaft 40 entering the dashpot shock absorber 34 fixed at the lower end of the control element assembly duct 20.

As noted hereinabove, the safety absorber assembly 18 is normally latched and positioned above the fissile fuel zone of the core. When the reactor is scrammed and the latch mechanism 16 releases the absorber assembly 18, safety element insertion is entriely controlled by the conditions within the duct 20. Under normal circumstances, the factors which influence the insertion rate include the spring force of a scram assist spring 80, the fluid drag of the coolant which is passing upward, over and around the absorber assembly 18, the absorber assembly weight, the buoyancy of the absorber assembly 18 in the coolant environment inside the duct 10 and the sliding friction between some of the absorber pins 38 which may contact the interior wall of the duct 20 during its free fall after release.

As can be appreciated, any unforeseen or unpredicted distortion to the duct 20 may result in the safety absorber assembly 18 not being inserted or at least not being fully inserted depending on how severe the duct distortion is. Normally duct distortion due to thermal gradients, neutron irradiation, and creep can be predicted and the control safety assembly be designed to accommodate this. But with unforeseen duct distortion, such as which might result from denting of the fuel assembly during fuel handling, adjacent fuel assembly failure, failure of the core clamping system or greater than expected thermal gradient and neutron irradiation induced creep, the final duct dimensions cannot be determined with certainty.

The present invention is accordingly directed to reducing the probability of the absorber assembly 18 becoming jammed in the duct when the assembly is scrammed. Simply stated, the concept is moving the absorber pins 38 of the absorber assembly 18 to increase the minimum lateral spacing between the absorber pins 38 and the interior wall of the duct 20 during downward movement of the absorber assembly 18. As shown in the drawings, the array of absorber pins 38 is supported from the support member 40 so that upon downward movement of the assembly 18, the array is laterally compacted to reduce the outer dimension of the absorber pin envelope.

Figure 2:
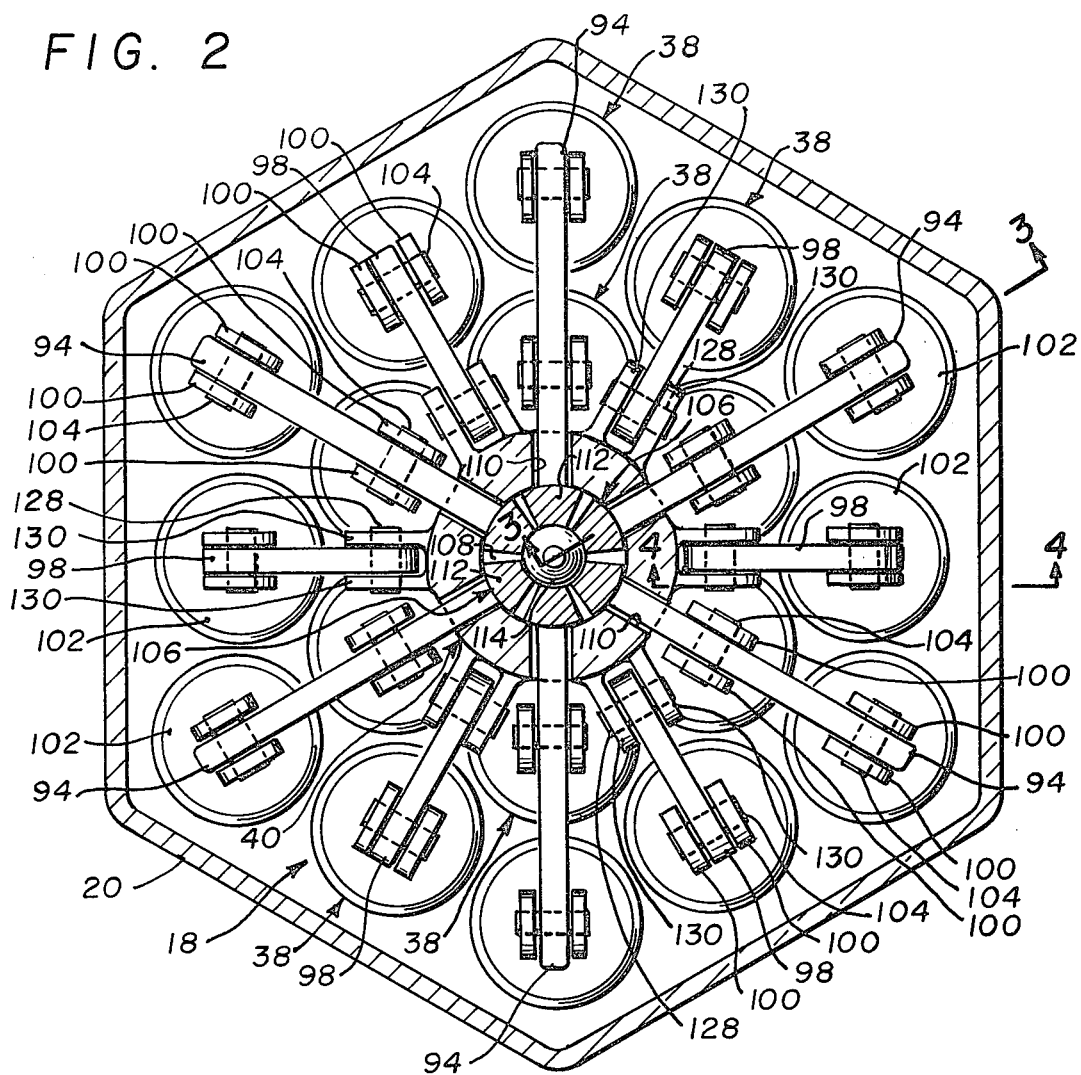
FIG. 2 is a sectional plan view of the assembly taken along line 2—2 of FIG. 1.
Figure 5:
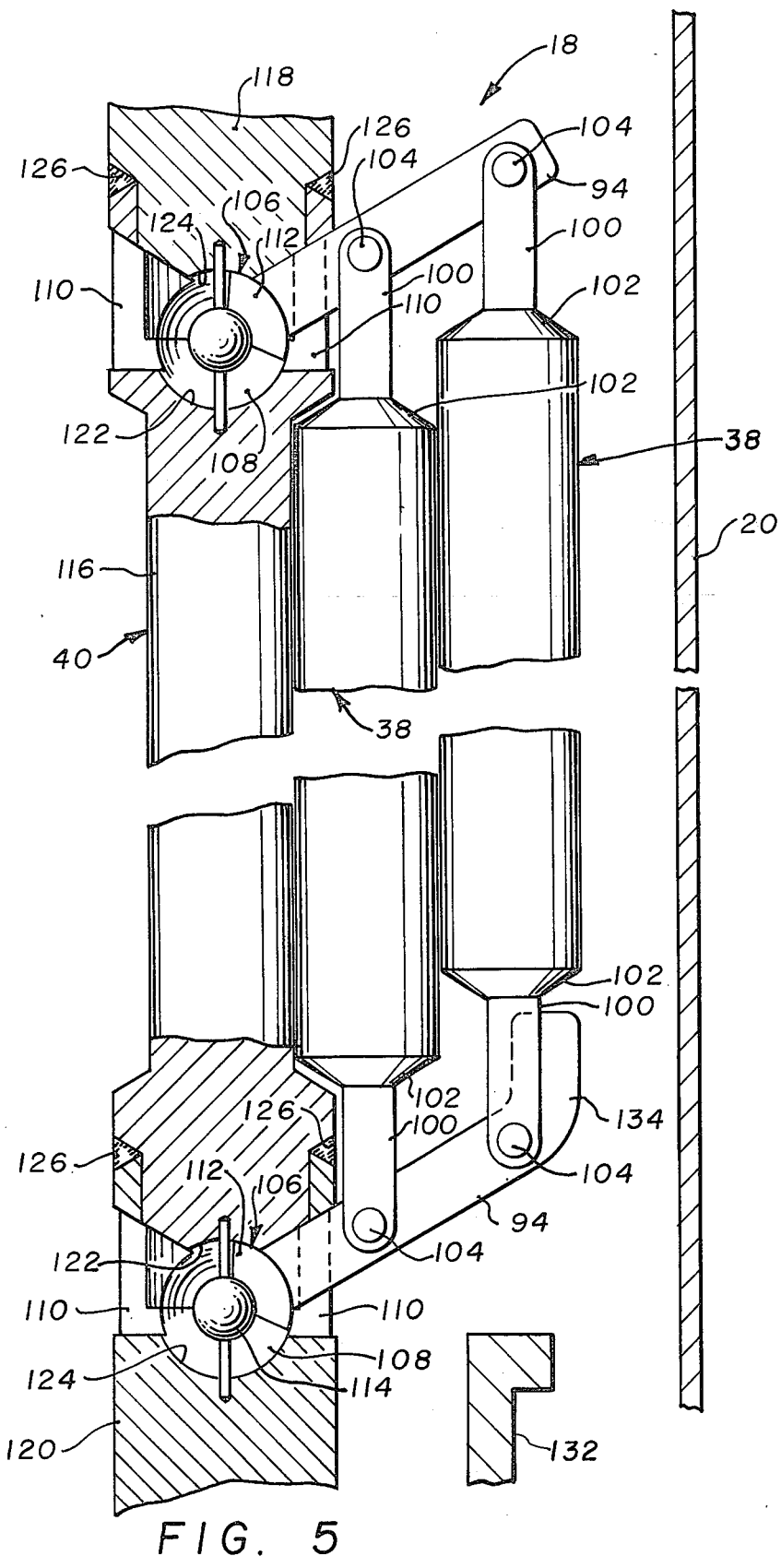
FIG. 5 is a partial side elevation of the assembly showing the absorber pins in their compacted position.

More specifically and as best shown in FIGS. 2 and 5, each of the absorber pins 38 is pivotably mounted to a pair of longitudinally spaced support arms 94 or 98 which in turn are pivotably mounted to the central support member or shaft 40, so as to be pivotably movable in a longitudinal plane. The pins 38, of which there are 18 in the preferred embodiment, are arranged in an hexagonal array within the duct 20. Each of the pins 38 is provided with a pair of spaced longitudinally extending flanges 100 integrally formed on each of the end caps 102. The support arms 94, 98 extend laterally outward from the central support shaft 40 of the absorber assembly 18 and are pin connected between the pairs of flanges 100 by the pins 104. Preferably the spacing between adjacent pins 38 within the duct 20 and between the pins 38 and the interior wall of the duct 20 is substantially the same so that the coolant distribution among the absorber pins 38 will be uniform.

Figure 3:
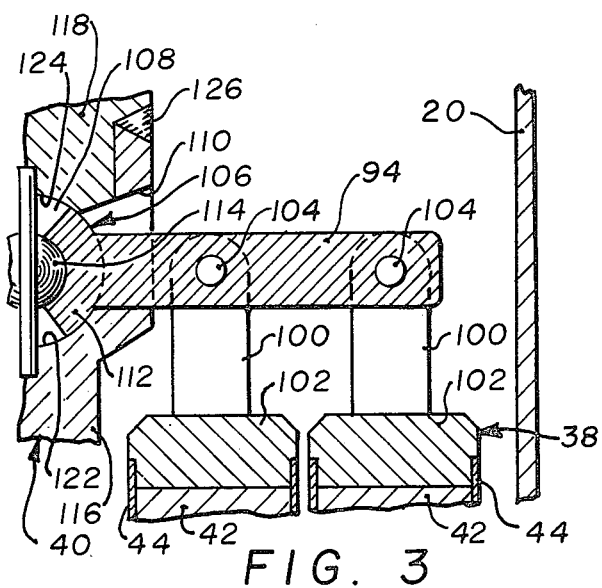
FIG. 3 is a side elevation taken along line 3—3 of FIG. 2 showing one type of absorber pin support.
Figure 4:
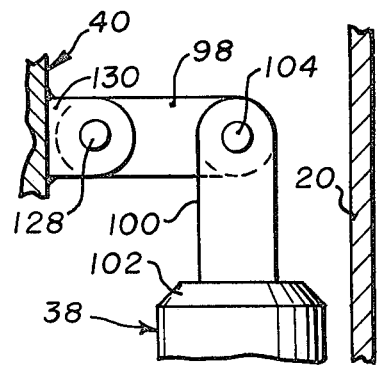
FIG. 4 is a side elevation taken along line 4—4 of FIG. 2, showing another type of absorber pin support.

In the preferred embodiment, two different methods are shown for pivotably supporting the support arms 94, 98 from the central support shaft 40 to substantially maintain equal lateral spaces between the adjacent absorber pins 38 and between the pins 38 and the interior wall of the duct 20. Twelve of the absorber pins 38, the six that are adjacent to the central support shaft 40 and the six which are furthest from the central support shaft 40 are supported from spherical T-slot mounted support arms 94 and the remaining six absorber pins 38 are supported from clevis mounted support arms 98. There are six support arms 94 which are supported from the central support shaft by spherical T-slot hinges 106, each of which is pin connected to a central absorber pin 38 and a peripheral absorber pin 38. The interior of the central support shaft 40 is provided with two longitudinally spaced spherical annuli 108. Each support arm 94 is provided with a spherical T-head 112 which is attached to the central support shaft 40 in one of the two spherical annuli 108. The arms 94 extend outward from the central support shaft 40 and the spherical annulus 108 through slots 110 provided in the shaft 40 adjacent to the spherical annulus 108. As can be seen in FIG. 2, the only requirement as to the size of the spherical T-head 112 is through the slots 110 in the wall of the shaft 40. As to the longitudinal arc dimension of the spherical T-head 112, the only requirement is that it be of sufficient dimension so that the T-head 112 will not bind or jam as the arm 94 is rotated upwards. This, of course, will depend on the radial thickness of the spherical annulus 108 and the coefficient of friction between the head 112 and the central ball 114 forming the interior spherical surface of the spherical annulus 108. As best seen in FIGS. 3 and 5, the lower surface of the slot 110 in the shaft wall is horizontal while the upper surface is angularly inclined. This allows the support arms 94 to pivot upwardly as will be appreciated hereinbelow.

For assembly of the spherical T-slot hinges 106, a three piece shaft construction may be used. The ends of the central longitudinal shaft member 116 are machined to provide a substantially hemispherical surface 127 at each end. Also, a substantially hemispherical surface 124 is machined in the mating ends of the two longitudinal shaft end members 118, 120. A pinned ball 114 may be centrally placed in the ends of the central shaft member 116, the spherical T-heads of the support arms 94 then placed between the hemispherical surface 122 and the ball 114 and the end members 118, 120 of the shaft 40 welded to the central member 116 such as shown at weld joints 126.

Each of the clevis mounted support arms 98 supports just one absorber pin 38. Each of these arms 98 are pin connected by pins 128 between a pair of laterally extending radially spaced flanges 130. Each pair of flanges 130 is fixedly attached to the outer surface of a central support shaft 40 between two of the slots 110 and at the same longitudinal elevation as the slots 110. As best seen in FIG. 2, the clevis mounted support arms 98 nest into the remaining spaces between the spherical T-slot mounted support arms 94.

A stop ring 132 is integrally formed on the upper surface of the piston 90 to act as a stop for the lower set of support arms 94, 98. In this way only pivotable upward movement of the support arms 94, 98 is permitted. Accordingly, each of the absorber pins 38 is pivotably supported from the central support shaft 40 by a pair of pivotably mounted support arms 94, 98. By pivoting the support arms 94, 98 upwards the array of absorber pins 38 is laterally compacted so that the minimum lateral spacing between the pins 38 and the interior wall of the duct 20 is increased. That is, the lateral spacing between the pins 38 which are normally closest to the interior wall of the duct 20 is increased.

Each of the lower spherical T-slot mounted support arms 94 is provided with an upwardly, angularly inclined or curved tip 134 at its laterally outermost end. When the support arms 94 are horizontal or in their lowered position, these tips 134 act to centralize and maintain angular orientation of the absorber assembly 18 within the duct 20. When the arms are pivoted upwardly to compact the absorber pin array, the tips 134 retract flush with the absorber pin envelope (see FIG. 5).

For normal reactor operation, assuming now that the control element assembly 10 is a safety assembly or one which provides additional shutdown margins to the reactor, the absorber assembly 18 is coupled to the drive extension 14 and raised to above the fissile fuel zone of the core. This is the position shown in FIG. 1, and is the normal position of the safety absorber assembly. Should the need to rapidly trip the reactor arise, the latching mechanism 16 releases the absorber assembly 18 thereby freeing the absorber assembly 18 to fall under the influence of gravity, with additional impetus being provided by the scram assist spring 80, into the reactor core region to scram the reactor. As the absorber assembly 18 falls within the duct 20 the array of absorber pins is uniformly closed up so that the minimum lateral spacing between the absorber pins 38 and the interior wall of the duct 20 is increased. The compacted position is shown in FIG. 5. In this way the probability of the absorber assembly 18 jamming in a distorted duct due to unpredicted or unforeseen duct distortion is minimized.

At least one and as many as three phenomena act to compact the absorber pin array during downward travel of the absorber assembly 18. First is an inertia effect. Since it is only the central support shaft 40 of the absorber assembly 18 which is accelerated downwards by the scram assist spring 80, the absorber pins 38 will lag behind the shaft 40 as the result of the support arms 94, 98 being freely pivotable upwards. Secondly, the fluid drag on the absorber assembly 18 during downward movement through the coolant will cause the support arms 94, 98 to pivot upwardly, to compact the array of absorber pins. Also, as the absorber pins 38 are compacted, the fluid drag on the absorber assembly 18 will be minimized. This is a streamlining effect which insures that the absorber pins 38 will remain compacted during downward movement. Furthermore, the reduced fluid resistance will reduce the insertion time for the absorber assembly which is highly desirable for fast spectrum reactors. Thirdly, if the duct is distorted and inward protrusions or bumps exist, the interaction between the protrusions and the tips 134 on the lower support arms 94 will act to pivot the support arms upwardly. Normally, it is only the first two phenomena which will act to close up the absorber assembly 18 since ordinarily the absorber pins 38 will be fully compacted by the time any protrusions are encountered during downward travel.

When the plunger or piston 90 on the lower end of the assembly 18 enters the dashpot shock absorber 34 to decelerate the absorber assembly 18, the absorber pins 38 are returned to their uncompacted state or position due to the inertia and weight of the absorber pins 38. In addition to ensuring that the control or absorber pins 38 are inserted upon a scram, the hinged supported support arms 94, 98 provide an inherent safety feature in that it enables detection of excessive duct distortion in a safe manner. The clearances between the absorber pins 38 and the interior wall of the duct 20 are arranged so that under normal operation the absorber assembly 18 is easily withdrawn without jamming. However, if the clearances are removed by duct distortion, then the absorber assembly 18 will jam upon an attempted withdrawal which could then be detected by a load cell in the drive mechanism 12. The damaged subassemblies could then be replaced and the cause of the distortion investigated.

With regard to the specific support arrangement described hereinabove, it will be appreciated that since the center of rotation of the spherical T-slot mounted support arms 94 is on the vertical centerline of the absorber assembly 18, the central support shaft 40, the six central absorber pins 38 and the six peripheral absorber pins 38 are packed into an hexagonal geometry. Also, since the remaining support arms 98 are clevis mounted to rotate at a convenient radius from the absorber assembly centerline, they will freely nest into the remaining space between the other support arms 94 during compaction of the absorber pins 38.

Also, as can be appreciated, other support methods can be used to mount the support arms from the central support shaft 40 for pivotable movement as well as other combinations of the two disclosed methods. For example, if more absorber pins 38 are required and/or because the clevis hinge is not desired, then the additional pins 38 could be supported from spherical T-slot mounted support arms which are in planes longitudinally offset from the other pairs of support arms. Or, in some cases, it may be expedient to use support arms carrying more than one pin 38 which do not pivot about the central axis of the central support shaft 40, but instead are clevis mounted on the outer surface of the support shaft 40. In these cases, radially adjacent pins 38 will interfere and prevent complete compaction, but this may be acceptable in view of simpler hardware.

Of course, as can be appreciated by those skilled in the art, a number of factors must be taken into consideration in optimizing the design of the control element assembly 10 for a particular reactor. For example, and not meant to be inclusive of all factors, consideration should be taken with respect to the relative weights of the central support shaft 40 and the absorber pins 38, the detree of friction between the support arms 94, 98 and the central support shaft 40, and the support arms 94, 98 and the absorber pins 38, the spring force of the scram assist spring 80, the buoyancy of the absorber assembly 18 in the coolant and the relative size of the absorber pin 38 and central support shaft 40.

Finally, it should be noted that the use of the present invention is not limited to use with safety control assemblies. The hinge supported support arms 94, 98 can also be employed for supporting the absorber pins 38 of regulating control assemblies which have a scram capability.

Thus it can be seen from the foregoing that there is hereinprovided a novel control assembly which reduces the probability of the absorber assembly 18 jamming in the control element assembly duct 20. The absorber pins 38 of the assembly 18 are supported from support members 94, 98 so that they can be compacted during downward movement of the absorber assembly 18 in the duct 20. In this way, the minimum lateral spacing between the absorber pins 38 and the interior wall of the duct 20 is increased during downward travel of the absorber assembly 18. When the movement of the absorber assembly 18 is stopped, the absorber pins 38 are returned to their initial or uncompacted state.

While one preferred embodiment of the invention has been shown and described it will be understood that it is merely illustrative and that changes may be made without departing from the scope of the invention as claimed.

What is claimed is:

1. In a nuclear reactor, the combination comprising:
a longitudinally extending duct positionable within the core of the nuclear reactor;
a control element support member longitudinally movable within said duct;
a plurality of parallel, longitudinally extending control elements supported by said support member for longitudinal movement therewith within said duct, said elements being positioned to provide at least a predetermined minimum lateral spacing between said control elements and the interior wall of said duct; and
means responsive to longitudinal movement in one direction of said support member for moving said control elements to increase the predetermined minimum lateral spacing between said control elements and the interior wall of said duct and for moving said control elements to return them to the position in which the predetermined minimum lateral spacing is provided when the longitudinal movement in said one direction of said support member is stopped.

2. The combination of claim 1 wherein said control elements are positioned laterally outward from said support member and wherein said moving means moves said control elements laterally inward toward said support member when said support member is moved in said one longitudinal direction.

3. The combination of claim 2 wherein said moving means only moves said control element toward said central support member when said support member is moved vertically downward and prevents said control elements from moving toward said support member when said support member is moved vertically upward.

4. The combination of claim 3 wherein said moving means comprises: a plurality of support arms extending laterally outward from said support member, each of said arms being supported by said support member for pivotal movement in a longitudinal direction; and wherein said control elements are pivotally supported by a longitudinally spaced pair of said support arms.

5. The combination of claim 4 wherein at least some of said arms are spherical T-slot mounted within said support member.

6. The combination of claim 4 wherein at least some of said support arms are clevis mounted to said support member.

7. An absorber assembly for movement into and out of the core region of a nuclear reactor, the assembly comprising:
a longitudinally movable support member;
a plurality of longitudinally extending parallel absorber elements supported from said support member, said absorber elements being arranged in a laterally spaced array;
means for laterally compacting said laterally spaced parallel array of absorber elements as said support member is moved in one longitudinal direction; and
means for laterally uncompacting said array of absorber elements when movement of said support member in said one longitudinal direction is stopped.

8. The absorber assembly of claim 7 wherein said laterally compacting means compacts said array of absorber elements when said support member is moved longitudinally into the core region and prevents compaction of said array of absorber elements when said support member is moved longitudinally out of the core region.

9. The absorber assembly of claim 8 wherein said lateral compacting means and said lateral uncompacting means comprise a plurality of longitudinally spaced pairs of support arms extending laterally from said support member, each of said support arms being pivotally mounted to said support member to permit pivotal upward movement of said support arms in a longitudinal plane; and each of said pairs of longitudinally spaced support arms pivotally support at least one of said absorber elements.

10. The absorber assembly of claim 9 wherein said support member is a central support shaft having a longitudinally extending central axis and said longitudinally spaced pairs of support arms are radially positioned about and pivotally supported from said central support shaft.

11. The absorber assembly of claim 10 wherein at least some of said longitudinally spaced pairs of support arms are pivotally mounted to said central support shaft to pivot about a point on said central axis of said central support shaft.

12. The absorber assembly of claim 11 wherein said pairs of said longitudinally spaced support arms which pivot about a point on said central axis of said central support shaft are spherical T-slot mounted within said central support shaft.

13. The absorber assembly of claim 10 wherein some of said longitudinally spaced pairs of support arms are mounted to said central support shaft to pivot about a point which is radially spaced from said central axis of said central support shaft.

14. The absorber assembly of claim 13 wherein said longitudinally spaced pairs of support arms which pivot about a point radially spaced from said central axis are clevis mounted to said central support shaft.

15. A control element assembly for a nuclear reactor comprising:
a duct positionable within the core of the nuclear reactor;
a support member longitudinally movable within said duct;
a plurality of longitudinally extending parallel absorber pins mounted to said support member for movement therewith, said pins being arranged with respect to said support member and said duct to provide at least a predetermined minimum lateral spacing between said pins and the wall of said duct;
drive means for longitudinally moving said support member within said duct;
latch means associated with said drive means for releasably coupling said support member to said drive means;

means associated with said latch means for the propelling said support member and said absorber pins into the core when said latch means releases said support member; and means responsive to the longitudinal motion into the core of said support member for increasing the predetermined minimum lateral spacing between said absorber pins and the wall of said duct.

16. The control element assembly of claim 15 further including means for moving said absorber pins to return said absorber pins to the position in which the predetermined minimum lateral spacing is provided when the longitudinal movement into said core of said support means is stopped.

17. The control element assembly of claim 16 wherein said means for laterally moving said absorber pins to increase the predetermined minimum lateral spacing between said absorber pins and said duct only permits said absorber pins to be moved when said support member is propelled into the core of the nuclear reactor and prevents said absorber pins from being moved to increase the predetermined minimum lateral spacing when said support member is withdrawn from the core of the nuclear reactor.

18. The control element assembly of claim 17 wherein said support member is a central support shaft and said absorber pins are positioned laterally outward from said central support shaft and wherein said means for moving said absorber pins to increase the predetermined minimum lateral spacing moves said absorber pins laterally inward toward said central support shaft when said central support member is moved into the core of the nuclear reactor.

19. The control element assembly of claim 18 wherein said moving means comprise a plurality of support arms extending laterally outward from said central support shaft, each of said arms being supported by said control support shaft for pivotal movement in a longitudinal direction; and wherein said absorber pins are pivotally supported by a longitudinally spaced pair of said support arms.

* * * * *